March 7, 1933.  O. B. BRIGGS ET AL  1,900,156

METHOD AND APPARATUS FOR MAKING BELT LACING HOOKS

Filed March 3, 1930  12 Sheets-Sheet 1

INVENTORS
Orville B. Briggs,
Grant M. Richard.
BY
Whittemore, Hulbert, Whittemore & Belknap
ATTORNEYS

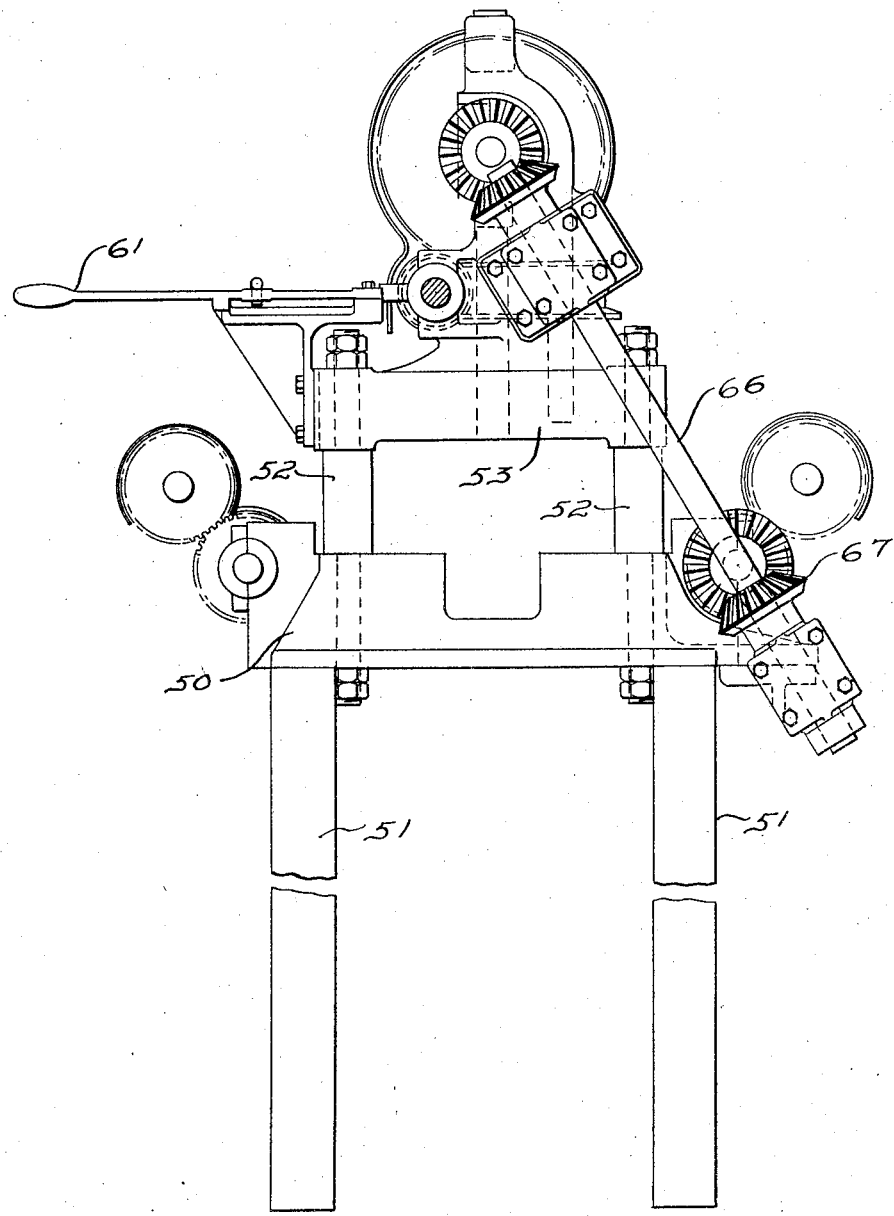

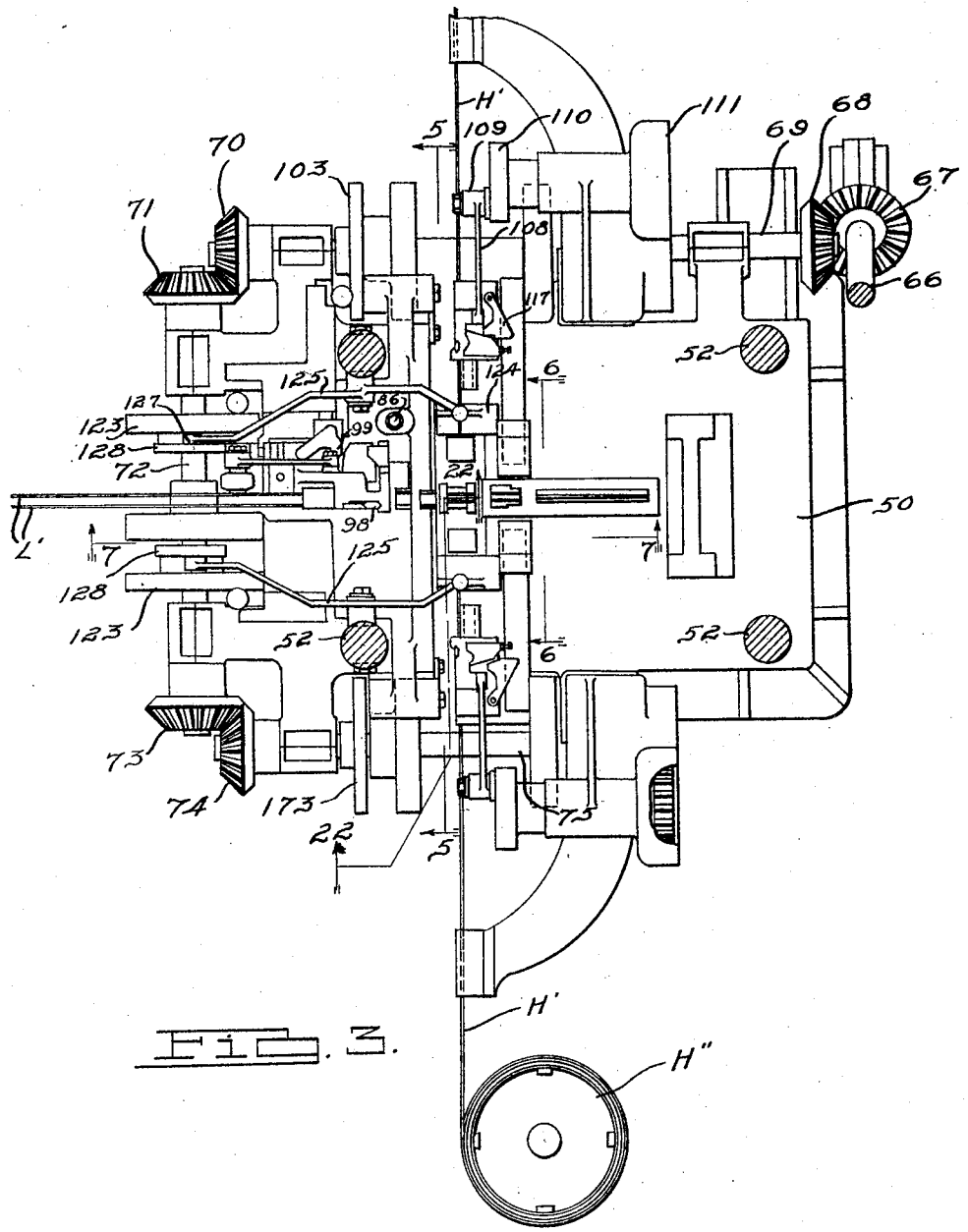

March 7, 1933. O. B. BRIGGS ET AL 1,900,156
METHOD AND APPARATUS FOR MAKING BELT LACING HOOKS
Filed March 3, 1930 12 Sheets-Sheet 4
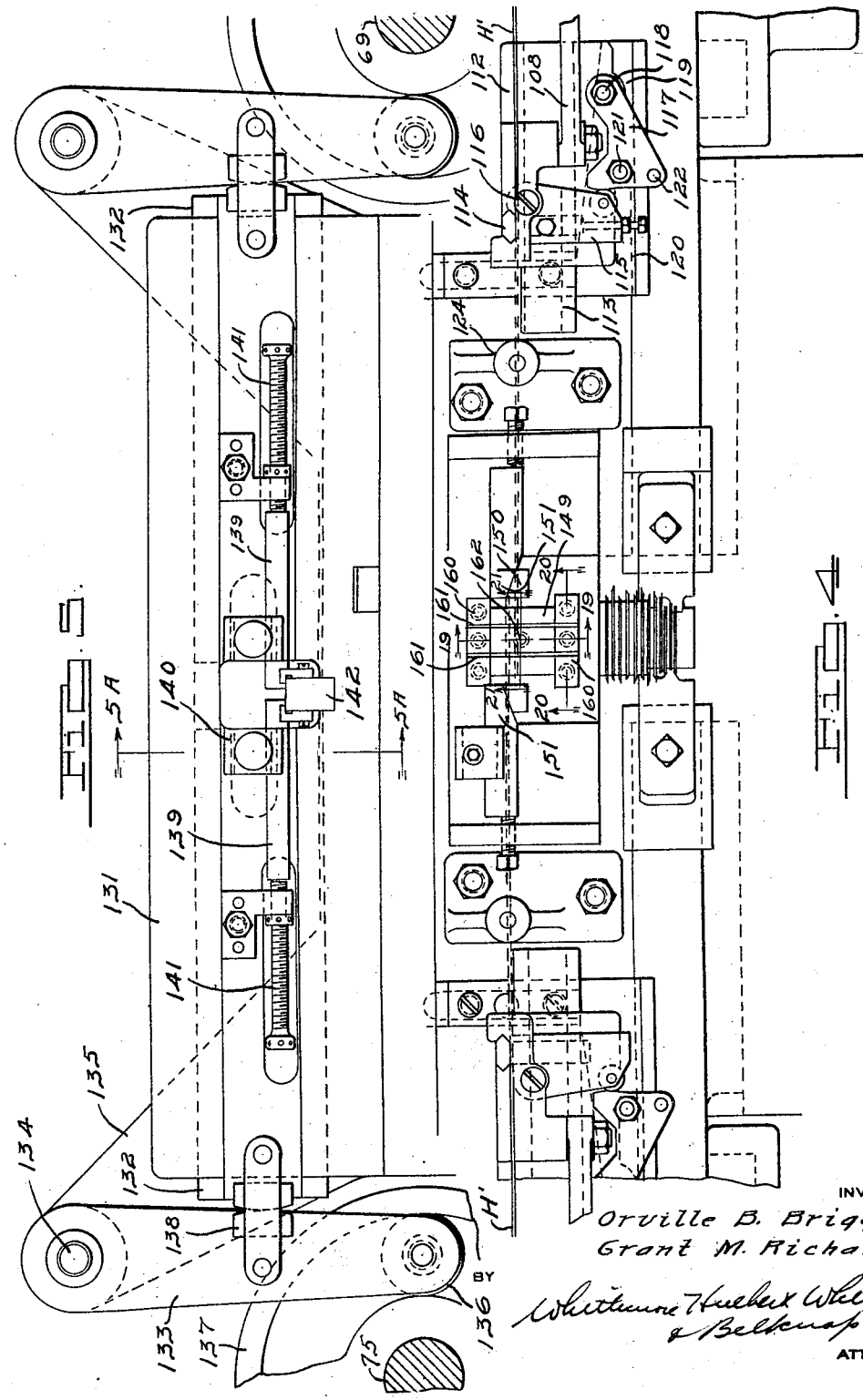
INVENTORS
Orville B. Briggs,
Grant M. Richard.
BY Whitmore Hulbert Whittemore
& Belknap
ATTORNEYS

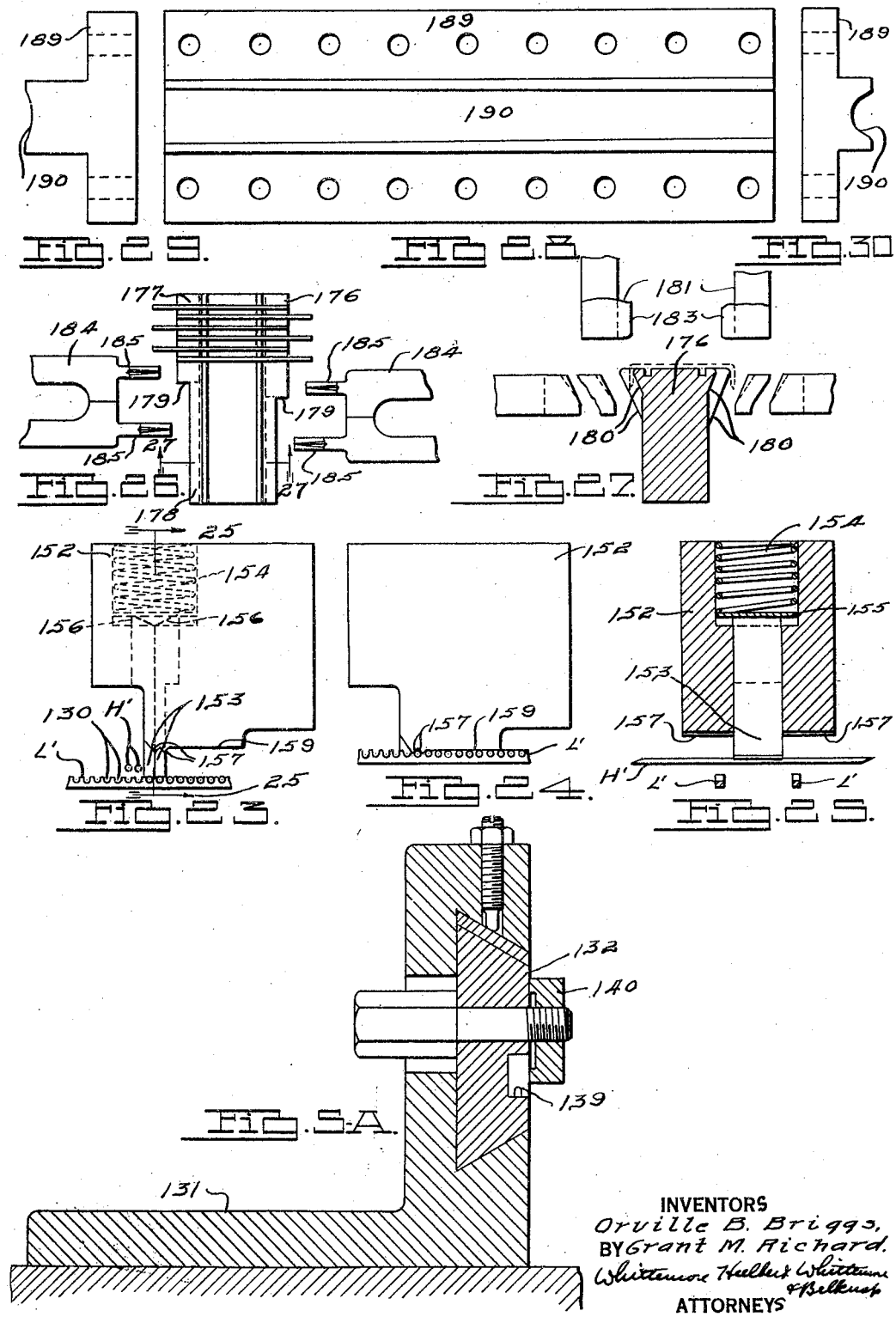

March 7, 1933. O. B. BRIGGS ET AL 1,900,156
METHOD AND APPARATUS FOR MAKING BELT LACING HOOKS
Filed March 3, 1930 12 Sheets-Sheet 6
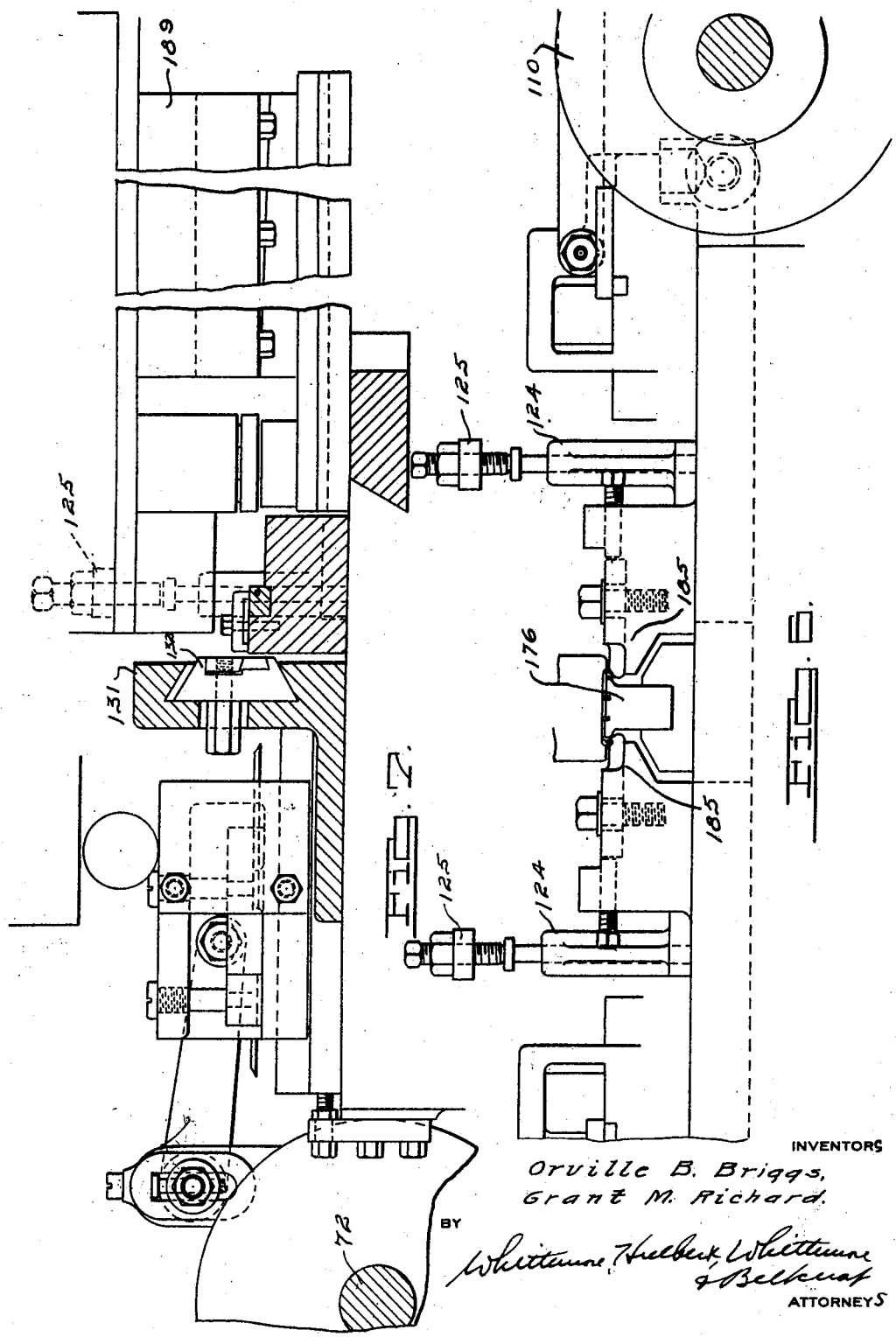
INVENTORS
Orville B. Briggs,
Grant M. Richard,
BY
ATTORNEYS

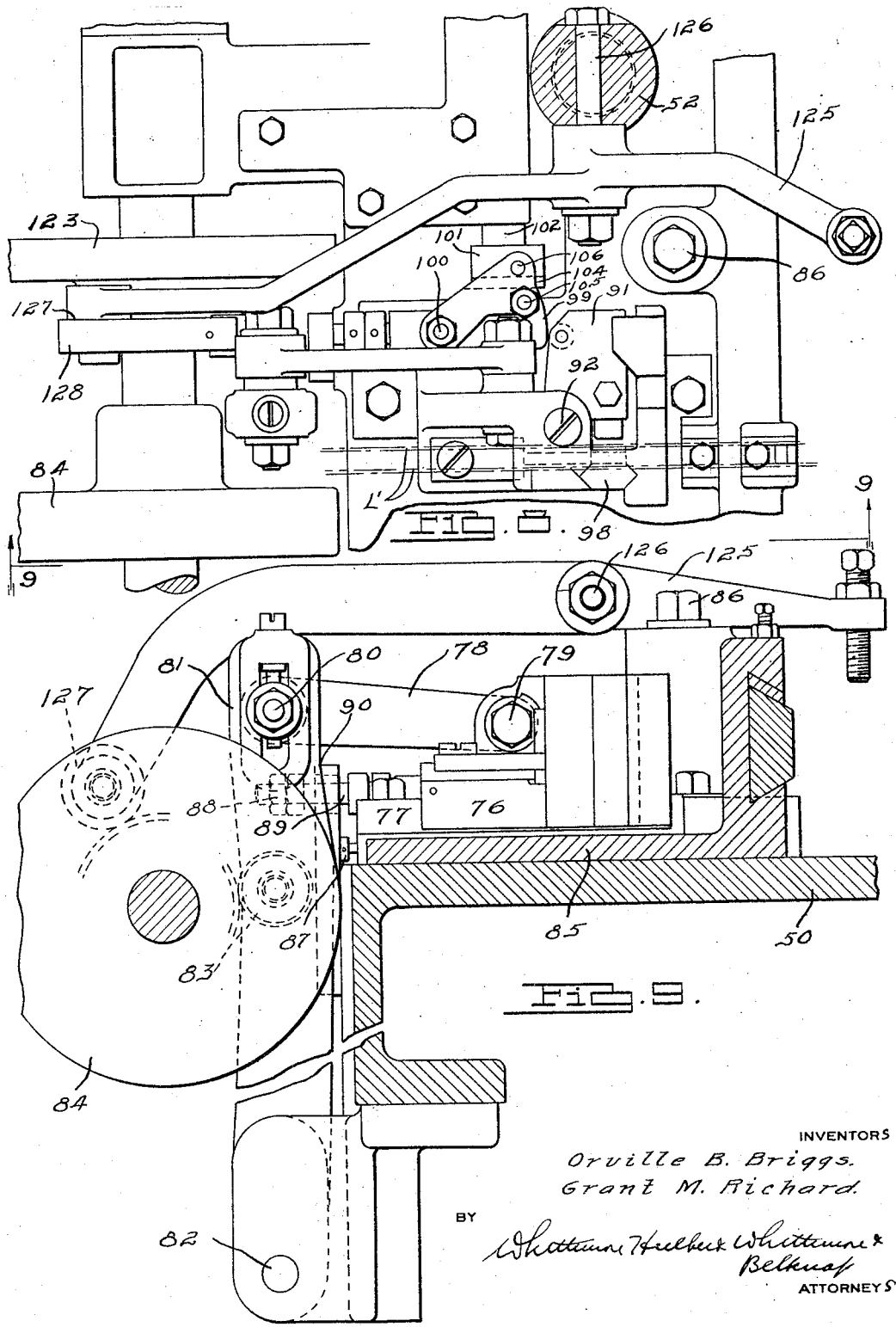

March 7, 1933. O. B. BRIGGS ET AL 1,900,156
METHOD AND APPARATUS FOR MAKING BELT LACING HOOKS
Filed March 3, 1930 12 Sheets-Sheet 8
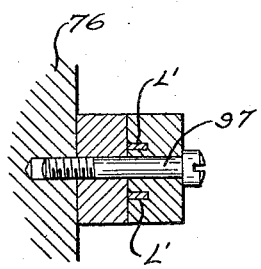
FIG. 8-B.
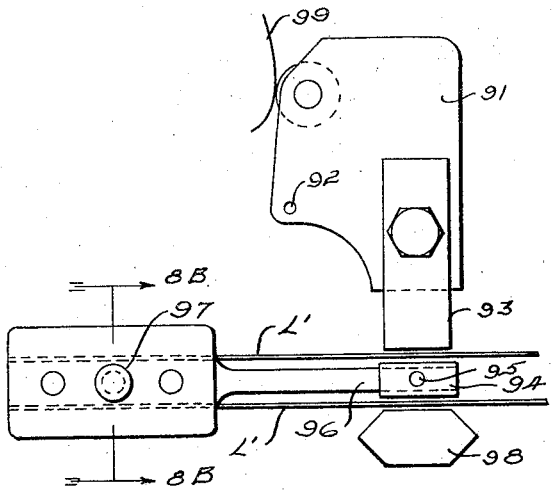
FIG. 8-A.
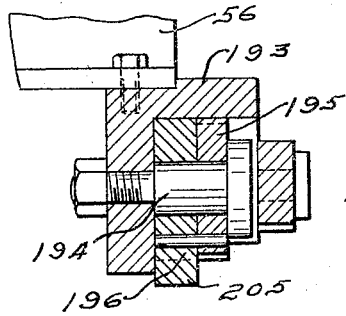
FIG. 12-A.
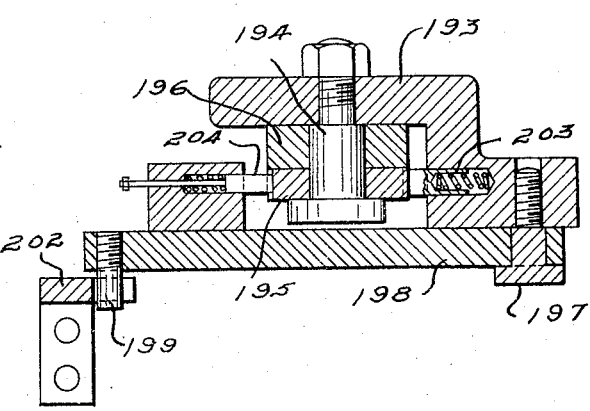
FIG. 12-B.
INVENTORS
Orville B. Briggs,
BY Grant M. Richard.
Whittemore Hulbert Whittemore & Belknap
ATTORNEYS

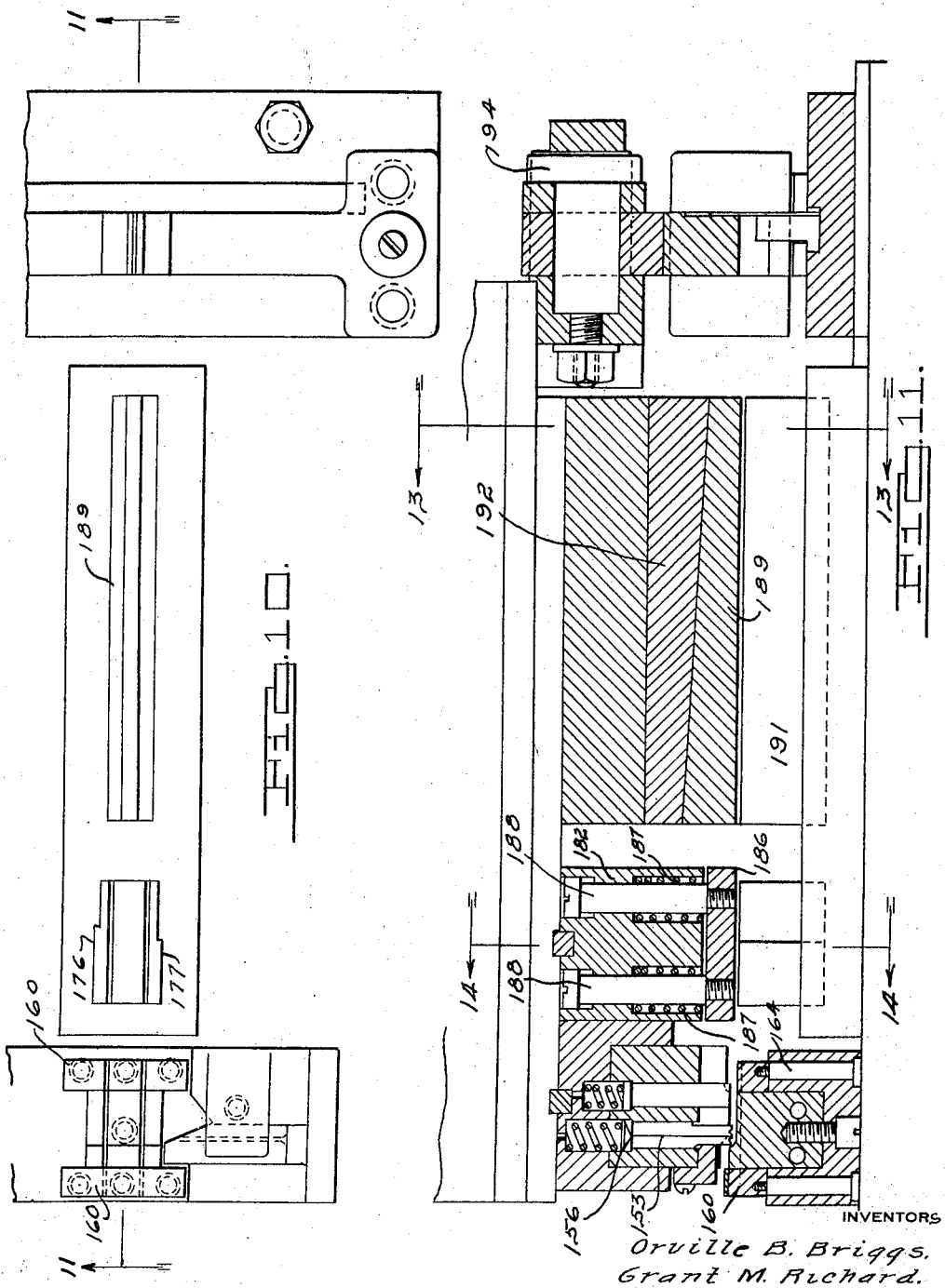

March 7, 1933. O. B. BRIGGS ET AL 1,900,156
METHOD AND APPARATUS FOR MAKING BELT LACING HOOKS
Filed March 3, 1930    12 Sheets-Sheet 10
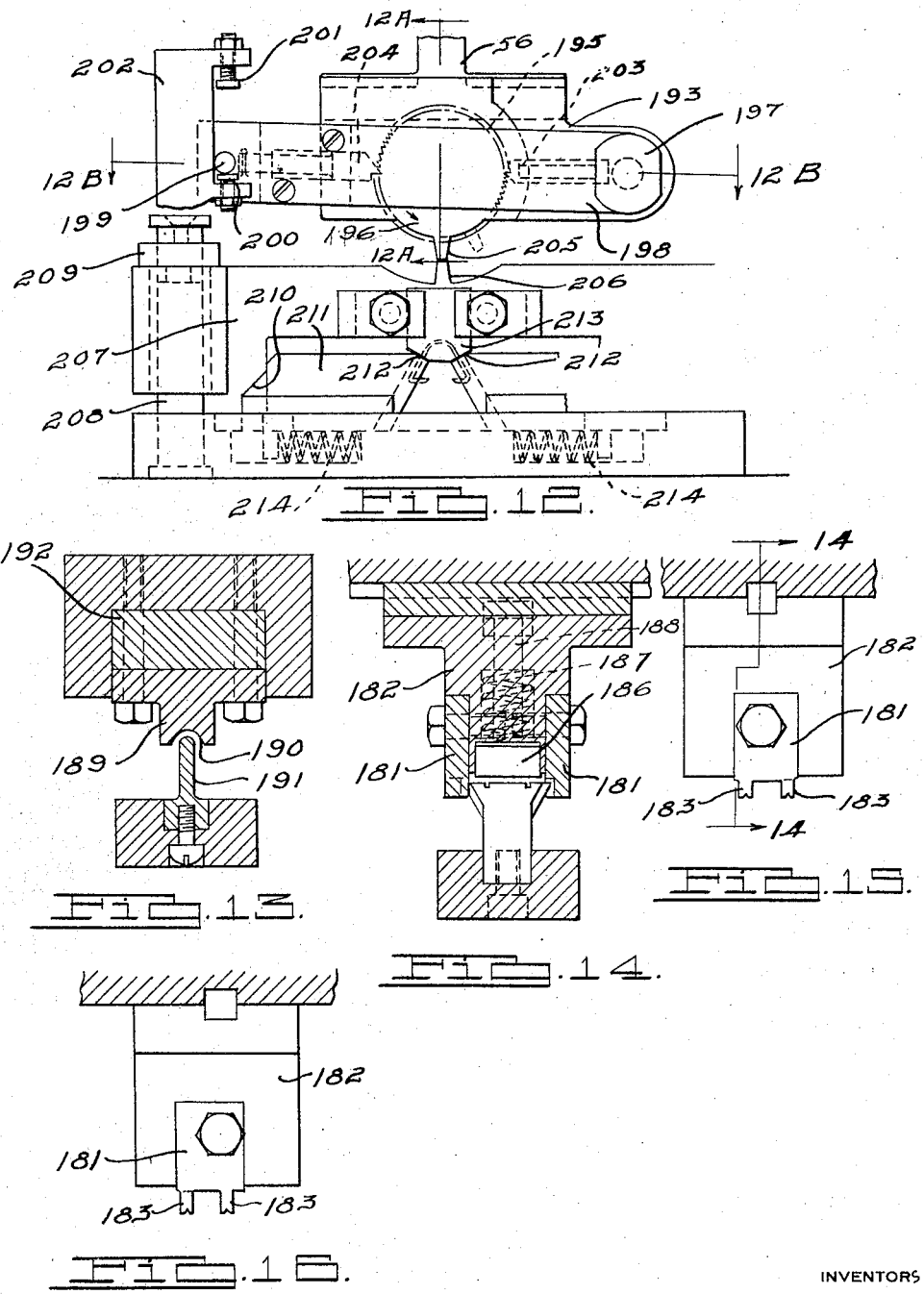
INVENTORS
Orville B. Briggs,
Grant M. Richard,
BY
Whittemore Hulbert Whittemore & Belknap
ATTORNEYS March 7, 1933.　　　O. B. BRIGGS ET AL　　　1,900,156
METHOD AND APPARATUS FOR MAKING BELT LACING HOOKS
Filed March 3, 1930　　12 Sheets-Sheet 11

INVENTORS
Orville B. Briggs.
BY Grant M. Richard.
Whittemore Hulbert Whittemore & Belknap
ATTORNEYS March 7, 1933. O. B. BRIGGS ET AL 1,900,156
METHOD AND APPARATUS FOR MAKING BELT LACING HOOKS
Filed March 3, 1930 12 Sheets-Sheet 12
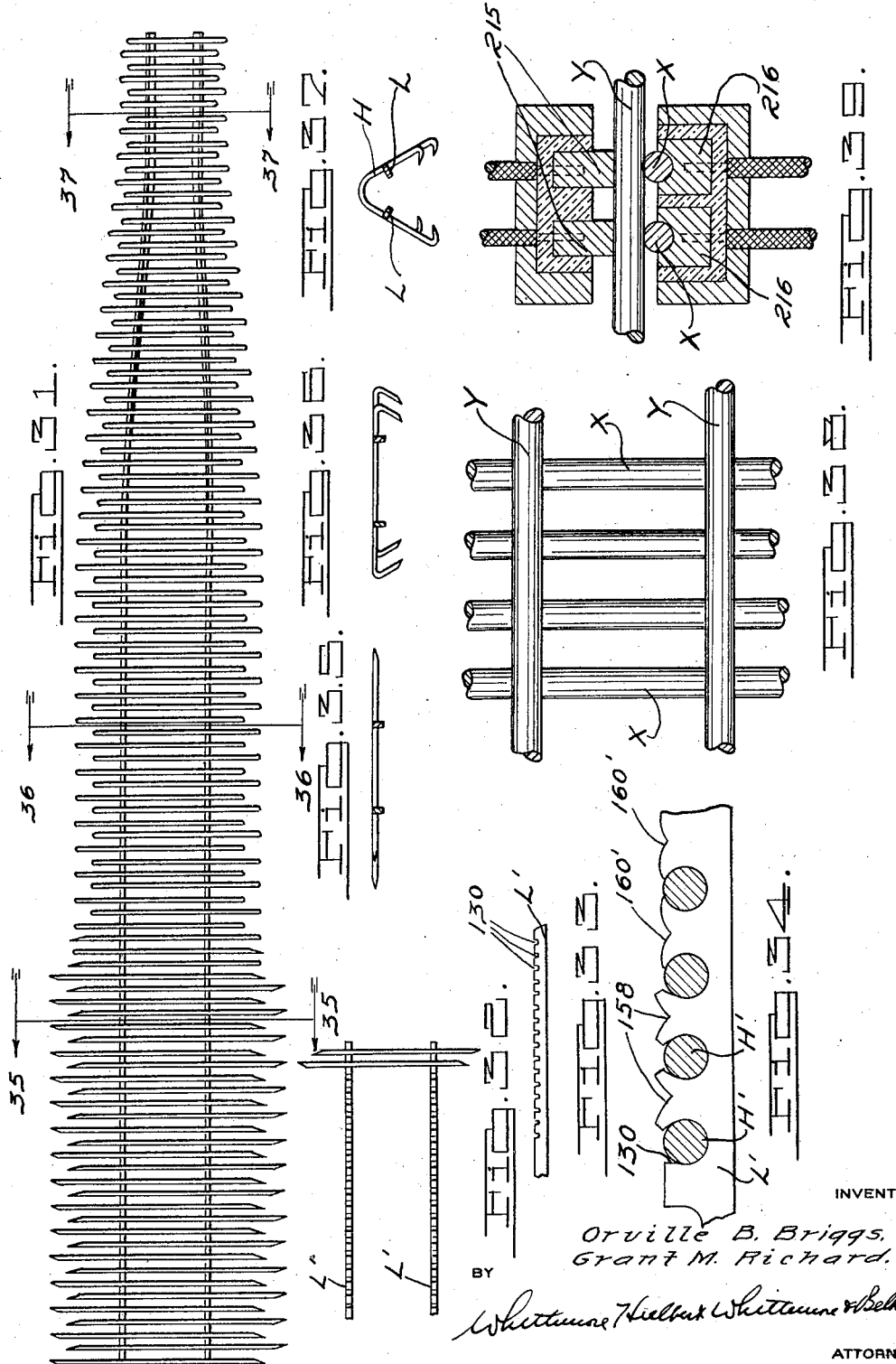
INVENTORS
Orville B. Briggs,
Grant M. Richard.
BY
ATTORNEYS Patented Mar. 7, 1933

1,900,156

UNITED STATES PATENT OFFICE

ORVILLE B. BRIGGS AND GRANT M. RICHARD, OF TOLEDO, OHIO, ASSIGNORS TO SAFETY BELT LACER COMPANY, OF TOLEDO, OHIO, A CORPORATION OF DELAWARE

METHOD AND APPARATUS FOR MAKING BELT LACING HOOKS

Application filed March 3, 1930. Serial No. 432,820.

This invention relates to a method of and a machine for manufacturing strips of belt lacing hooks and has as its objects to simplify, render more efficient and improve generally methods and machines of this character.

As distinguished from several other well known commercial forms of belt lacing hooks, the present invention relates to a method and machine for manufacturing permanently united gangs or strips of belt lacking hooks comprising a plurality of belt lacing hooks rigidly united and spaced in parallel relation by means of one or more lacing bars.

The present method and machine are particularly adapted for the production of the type of belt lacing hook illustrated and described in Letters Patent No. 1,789,191 issued January 13, 1931.

It is an object of this invention to provide a method and means for continuously forming permanently united strips or gangs of belt lacing hooks.

Therefore in accordance with the present invention, means is provided for longitudinally feeding, by a step-by-step movement, one or more continuous lengths of lacing bars; means for simultaneously perforating the lacing bars to provide longitudinally spaced open end recesses; means for simultaneously feeding from opposite sides of the lacing bars, belt hook wires; means for severing the belt hook wire into belt hook lengths; means for positioning these lengths of belt hook wires in the recesses in the lacing bars and permanently uniting the wires and lacing bars; means for shaping the belt hook wires to provide hook-like ends and for subsequently transversely bending the resulting structure to form belt hooks of substantial U-shape; and means for automatically periodically severing the lacing bars to provide gangs or strips containing a predetermined number of belt hooks.

The several objects, advantages and novel details of construction as well as the manner in which our improved method is performed will be made more apparent as this description proceeds, especially when considered in connection with the accompanying drawings, wherein Figure 1 is a side elevational view of a machine constructed in accordance with this invention;

Figure 2 is an end elevation of the machine as seen from the right in Figure 1;

Figure 3 is a sectional elevational plan view of the machine taken substantially on the plane indicated by line 3—3 in Figure 1;

Figure 4 is an enlarged fragmentary plan view of a portion of the structure illustrated in Figure 3;

Figure 5 is a fragmentary sectional elevational view taken substantially on the plane indicated by line 5—5 in Figure 3;

Figure 5A is a detail sectional view taken substantially on the plane indicated by line 5A—5A in Figure 5;

Figure 6 is a sectional elevational view taken substantially on the plane indicated by line 6—6 in Figure 3;

Figure 7 is a sectional elevational view taken substantially on the plane indicated by line 7—7 in Figure 3;

Figure 8 is an enlarged sectional plan view of a portion of the flat wire feeding mechanism;

Figure 8A is a semi-diagrammatic detail plan view of the flat wire gripping mechanism;

Figure 8B is a detail sectional view taken substantially on the plane indicated by line 8B—8B in Figure 8A;

Figure 9 is a fragmentary sectional elevational view taken substantially on the plane indicated by line 9—9 in Figure 8;

Figure 10 is a fragmentary plan view of that portion of the machine containing the lower die member;

Figure 11 is a fragmentary longitudinal vertical sectional view taken substantially on the plane indicated by line 11—11 in Figure 10 showing both the upper and lower die members;

Figure 12 is a fragmentary end elevational view of the cut-off mechanism;

Figure 12A is a vertical sectional view taken substantially on the plane indicated by line 12A—12A in Figure 12;

Figure 12B is a horizontal detail sectional view taken substantially on the line indicated by line 12B—12B in Figure 12;

Figure 13 is a sectional view taken substantially on the plane indicated by line 13—13 in Figure 11;

Figure 14 is a sectional view taken substantially on the plane indicated by line 14—14 in Figure 11 and line 14—14 in Figure 15;

Figure 15 is a side elevational view of the structure illustrated in Figure 14;

Figure 16 is a side elevational view of the other side of the structure shown in Figure 14;

Figure 23 is a semi-diagrammatic side elevational view of the swaging die;

Figure 24 is a similar view showing the die in swaging position;

Figure 25 is a transverse sectional view through the swaging die taken substantially on the plane indicated by line 25—25 in Figure 23;

Figure 26 is a semi-diagrammatic plane view of the hook forming die;

Figure 27 is a semi-diagrammatic view taken substantially on the plane indicated by line 27—27 in Figure 26;

Figure 28 is an inverted plan view of the upper bending die;

Figure 29 is an end elevational view of the left hand end of the bending die in operative position;

Figure 30 is an end elevational view of the right hand end of the bending die in operative position;

Figure 31 is a plan view of the lacing ladder formed by the machine showing progressively the steps of the formation of the completed belt hook lacing;

Figure 32 is a fragmentary elevational view showing one of the steps of the method;

Figure 33 is a fragmentary elevational view of one of the lacing bars;

Figure 34 is an enlarged fragmentary view showing the steps of the swaging operation;

Figure 35 is a sectional view taken substantially on the plane indicated by line 35—35 in Figure 31;

Figure 36 is a sectional view taken substantially on the plane indicated by line 36—36 in Figure 31;

Figure 37 is a sectional view taken substantially on the plane indicated by line 37—37 in Figure 31;

Figure 38 is a fragmentary elevational view of a modified form of belt hook lacing, and Figure 39 is a semi-diagrammatic view showing a walling mechanism for uniting the lacing bars and hooks of the structure illustrated in Figure 38.

Figure 1:
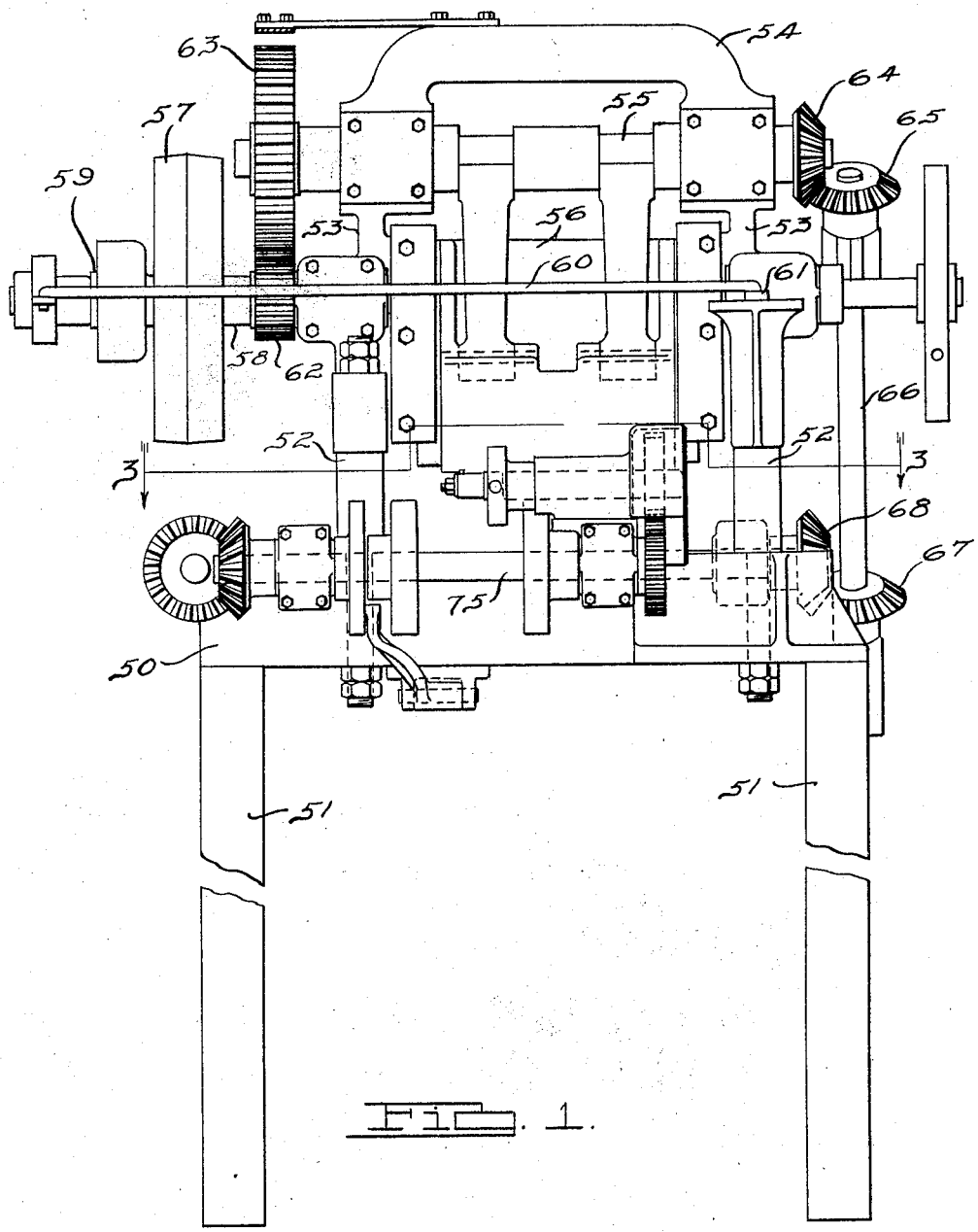

Referring now particularly to the drawings wherein like reference characters indicate like parts, it will be noted that there is illustrated, see particularly Figures 1, 2 and 3, a main support or bed plate 50 supported upon suitable legs 51. The superstructure consists of uprights 52 extending upwardly from the bed plate 50 and supporting transversely extending end frames 53 spaced longitudinally of the machine and connected by a top frame member 54. Mounted longitudinally of the machine in the superstructure is a crank shaft 55 and vertically reciprocating in the end frames 53 is the cross head 56 which supports the movable die members in a manner which will be hereinafter more fully referred to.

The driving mechanism consists essentially of a driving pulley 57 adapted to be connected to the shaft 58 by means of a clutch mechanism indicated generally by the reference character 59, the latter being operated by means of a rod 60 and a hand lever 61. Keyed to the shaft 58 is a pinion 62 which meshes with a gear 63 keyed to one end of the crank shaft 55. Keyed to the other end of this shaft is a bevel pinion 64 which meshes with a bevel pinion 65 keyed to the upper end of shaft 66. A bevel pinion 67 on the lower end of this latter shaft meshes with a bevel pinion 68 keyed to the end of shaft 69 extending longitudinally of the machine adjacent the bed plate 50 and at one side thereof. A bevel pinion 70 is keyed to the other end of the shaft 69 and meshes with a bevel pinion 71 on a shaft 72 extending transversely of the machine at the end thereof. A bevel pinion 73 on this latter shaft meshes with a bevel pinion 74 on a shaft 75, companion to shaft 69.

By reference to Figures 31 to 37 inclusive it will be noted that the problem involved is that of producing a gang of belt lacing hooks H united by one or more longitudinally extending lacing bars L. The hooks H are formed preferably of round wire cut from continuous lengths and shaped to form the hooks, whereas the lacing bars L are preferably constructed from continuous lengths of flat wire stock. By reference to Figure 3 it will be noted that the round wire from which the hooks H are constructed is contained on reels H" arranged at either side of the machine and fed laterally from both sides of the machine into the forming mechanism. The flat stock from which the lacing bars L are formed is carried on reels (not shown) located on suitable supports to the left of the machine as seen in Figure 3. The lacing bar stock is indicated by the reference character L' whereas the stock from which the hooks are formed is indicated by the reference character H'.

The round stock H' is fed from both sides of the machine laterally into the forming mechanism where it is sheared to length in size sufficient to form the hooks H, whereas the stock L' is brought into the machine from one end thereof and is notched at longitudinally spaced points along one edge to receive the lengths of round stock from which the hooks are formed. Thereafter the lengths of round stock are forced into the recesses in the lacing bars and the lacing bars and hook wires are perfectly united by swaging operations. Thereafter, the ends of the cross wires are bent to form hooks and subsequently the entire structure is bent into substantially inverted U-shape to produce the cross section illustrated in Figure 37. Thereafter, the structure is cut into lengths containing a predetermined number or a gang of belt hooks.

By comparison of Figures 3, 8, 8A and 8B, the manner in which the stock L' is fed into the machine will be made apparent. The stock is fed forward by a gripping mechanism carried upon a slide 76 reciprocated on a guideway 77 by means of a crank 78 pivotally connected to the slide as at 79 and pivotally connected as at 80 to the upper end of crank lever 81. This latter crank lever is pivotally supported as at 82 and carries a roller 83 engaging a female cam groove in cam 84. The guideway 77 for the slide 76 is mounted upon a member 85 adjustable longitudinally on the bed plate 50 and held in adjusted position by means of a plurality of clamping bolts 86, one of which is shown in Figures 8 and 9. The reference character 87 indicates an adjusting screw for longitudinally adjusting the slidable member 85 when the clamping bolts 86 are loosened. In this way the slide and the stock L' is longitudinally adjusted to line up the recesses formed therein with the cross wires H' which are fed thereinto. The reference character 88 indicates adjustable nuts on a rod 89, which nuts engage a fixed stop 90 to limit the reciprocable movement of the slide 76.

During the forward feed of the stock L' it is gripped by a gripping mechanism shown most clearly in Figure 8A. This gripping mechanism consists of a member 91 pivoted as at 92 and carries a gripper block 93. This gripper block 93 is urged into engagement with one of the lengths of stock L' which also engages a block 94 swivelly connected as at 95 to the end of a member 96, the latter being pivotally connected as at 97 to the slide 76. When the gripper block is urged into engagement with one of the lengths of stock L' this stock, together with the swivel block 94, is displaced against the other length of stock L' which in turn is urged against an anvil 98. This thoroughly grips the two lengths of stock L'. The member 91 is rocked about its pivot 92 by means of a cam 99 pivotally mounted as at 100, the cam being swung by means of an operating member 101 carried by a slide 102, which in turn is reciprocated by cam 103 mounted on shaft 69, see particularly Figure 3. The member 101 is L-shape in vertical cross section to provide an upstanding portion 104, a roller 105 carried by the cam member engaging one side of this upstanding portion and a pin 106 engaging the other side thereof. Thus, reciprocable movement of slide 102 as caused by cam 103 oscillates member 91 to cause the same to grip the lengths of stock L' in the manner previously referred to.

The stock H' from which the hooks are made is fed laterally from each side of the machine by identical mechanism, so that a description of one will suffice. By reference to Figures 3 and 4 it will be noted that the stock H' is fed by means of a slide 112 reciprocated by means of a crank lever 108 actuated by a crank pin 109 on a disk 110. This latter disk is driven through gearing contained in a gear casing 111 from shaft 69. The slide 112 reciprocates on guideway 113 and during this movement toward the center of the machine it is adapted to grip the stock H' to feed the same a predetermined distance. The gripping mechanism is substantially similar to the gripping mechanism described in connection with the stock L' and consists of an anvil 114 against which the stock H' is pressed by member 115 pivotally mounted as at 116 and adapted to be rocked about its pivot by means of a cam member 117 pivotally mounted as at 118. A slide plate 119 has an upstanding portion 120 engaged on the one side by a roller 121 and on the other side by a pin 122 carried by the cam member 117. The slidable plate 119 is reciprocated by a cam member 123 rotated by shaft 72.

The stock H' passes through a check device comprising a tubular member 124 having a plunger therein adapted during the receding movement of the slide 112 to grip the stock H' to prevent the same from being drawn backwardly. This plunger is actuated by means of a check lever 125 pivotally supported as at 126 and actuated by having a roller 127 carried thereby engaging the female cam groove in a cam 128. The mechanism is so timed that each length of stock H' is fed forward a required distance by the slide 112 whereupon the check mechanism is actuated to grip the stock whereupon the slide is moved backward, the gripping mechanism carried thereby being released during this movement. This insures a constant uniform forward feed of the stock H' upon each operation and eliminates the possibility of the inherent resiliency of the stock or the dragging action of the feeding mechanism from partially withdrawing the stock.

The flat stock L' having been fed into the machine the first operation in connection therewith is to perforate the same to provide the longitudinally spaced recesses 130 in one longitudinal edge thereof, see particularly Figure 32. The structure for accomplishing this is best seen from examination of Figures 3, 5, 5A, 17 and 18. As best seen from Figures 5 and 5A, a substantially L-shaped casting 131 is secured to the base of the machine and slidably mounted longitudinally of this casting, in dove-tailed grooves formed in one face thereof, is a pair of slides 132. These slides are reciprocated by levers 133 pivotally supported as at 134 on brackets 135, the lower end of each lever being provided with a roller 136 engageable in the groove of a female cam 137. The cams 137 are carried respectively by the shafts 69 and 75 arranged on opposite sides of the machine. Each lever 133 is connected to its respective slide 132 by means of a link 138.

Each slide 132 carries a notching punch 139 in a recess in the face thereof. A clamp 140 is employed for holding the notching punch in its recess and each punch is longitudinally adjustable with respect to its slide 132 by means of an adjusting bolt 141.

Figures 17, 18:
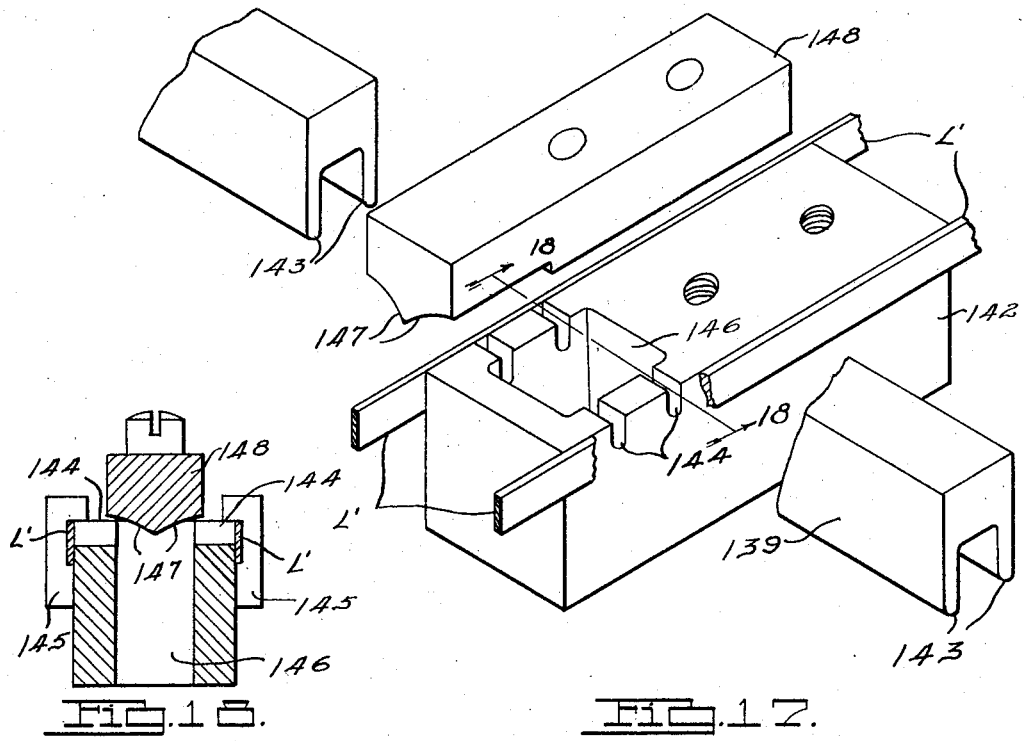
Figure 17 is a separate perspective view of several parts of the notching die.
Figure 18 is a vertical transverse sectional view through the notching die taken substantially on the plane indicated by line 18—18 in Figure 17.
Figures 19, 20, 21:
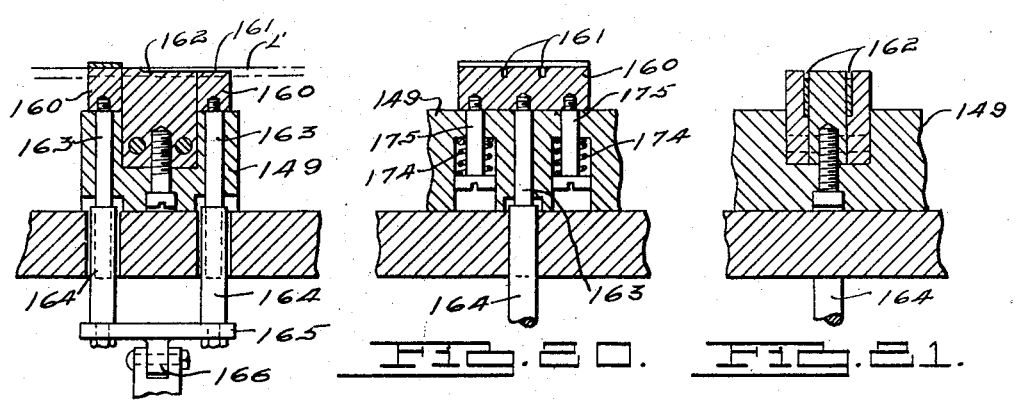
Figure 19 is a fragmentary sectional view taken substantially on the plane indicated by line 19—19 in Figure 4.
Figure 20 is a detail sectional view taken substantially on the plane indicated by line 20—20 in Figure 4.
Figure 21 is a detail sectional view taken substantially on the plane indicated by line 21—21 of Figure 4.
Figure 22:
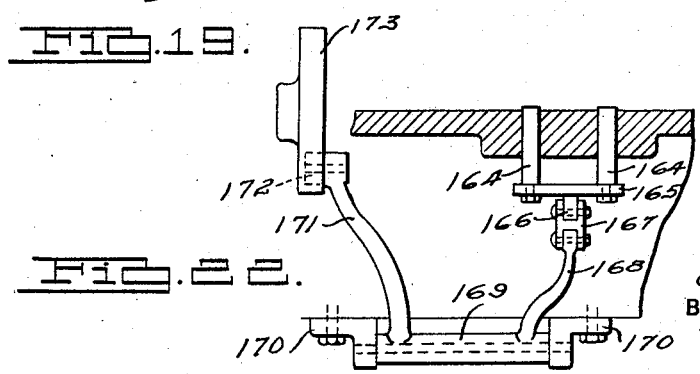
Figure 22 is a fragmentary semi-diagrammatic detail elevational view showing the gripper mechanism.

By reference particularly to Figures 5 and 17 it will be noticed that the pair of notching punches 139 are adapted to cooperate with a notching die 142 secured to the main bed plate. Each notching punch is provided with a pair of spaced cutting portions 143 so that upon each operation a pair of recesses 130 are made in the corresponding flat stock piece L'. Each notching die 142 is provided with a pair of spaced grooves 144 adapted to receive the cutter 143, the stock L' being fed longitudinally of the die 142 adjacent the longitudinal sides thereof and between the die and guides 145. The die 142 is formed with an aperture 146 into which the chips or stock punched by the notching punches 139 is adapted to fall. These chips are deflected downwardly into the aperture 146 by the inclined surfaces 147 of a deflector 148 secured to the top of the die.

The construction of the slides and the manner of mounting the notching punches thereon permits the punches to be adjusted or removed and replaced as they become worn.

The round stock H' from which the hooks are formed is fed simultaneously from both sides of the machine over grooved guide or die blocks 149 in which the flat wire stock L' is located. At the end of the forward feeding movement of the two lengths of stock H' the cross head operates to lower shearing punches 150 which cooperate with stationary shearing dies 151 to shear the round wire stock H' into lengths, each sufficient to form a belt lacing hook H, the ends of these wires being cut at an angle to form pointed ends as most clearly illustrated in that portion of the ladder illustrated at the left of Figure 31. At the same time the swaging operation occurs, the swaging die construction being best shown in Figures 11, 23, 24 and 25.

As the round wire stock H' is fed over the perforated flat stock L', the round wire stock is disposed over the recesses 130 formed in the flat wire L', the position of these round wires being indicated in dotted lines in Figure 23. On the next operation, the swaging die 152 is lowered. This swaging die carries a pair of plungers 153 having notched lower ends adapted to engage the pair of wires H' to force the same in the recesses 130. One of the plungers 153 engages each wire H' but the two plungers are normally urged in their extended position by means of a common spring 154 arranged in a recess in the swaging die 152. This spring bears upon a plate 155 and the upper end of each plunger 153 is provided with a beveled surface 156 so that each of the plungers can move independently of the other if either of the plungers encounters a greater resistance than the other in forcing the wires H' into the recesses 130.

This pressing of the wires H' into the recesses 130 of the lacing bars occurs prior to the actual swaging operation performed by the die 152 so that the wires H' are fully pressed within the recesses 130 prior to the commencement of the swaging operation which, as will be apparent, occurs during the latter part of the downward movement of the die 152.

A portion of the lower face of lower die 152 is provided with a pair of V-shaped or wedge-shaped projections 157 so spaced as to be adapted to engage the edge of the corresponding lacing bar L' between the recesses 130 thereof to form V-shaped grooves 158. The formation of these grooves spreads or flows the metal of the lacing bar laterally over the hook wires H', see more particularly Figure 34. That portion of the lower face of the swaging die next adjacent the V-shaped projections 153 is flat to provide a surface 159. On the next operation the metal spread by reason of the previously formed V-shaped grooves 158 is further flattened as indicated at 160' (see Figure 34) to complete the swaging operation and substantially enclose the hook wires H' in the recesses 130

130. This operation also flattens the top edge of the lacing bars to present a substantially smooth contour.

In Figure 23 the position of the swaging die 152 at the commencement of its downward movement is indicated and in Figure 24 the swaging die is indicated in a position it assumes at the end of its downward movement and just prior to the commencement of its upward movement. As seen from Figure 25 the V-shaped projections 157 are arranged at either side of the die, as are also the flat swaging surfaces 159, so as to operate simultaneously on the pair of lacing wires L'. The plungers 153 are arranged centrally of the swaging die so as to engage the hook wires H' between the lacing bars L'.

During the swaging operation there is a possibility that the deformation or the flowing of the metal in the lacing bars L' might cause the same to come wedged or stuck in the die or guide block 149 and for this reason stripping means is provided which actuates after each swaging operation to strip the lacing bars L' from the grooves in the die block. The structure for accomplishing this is best seen in Figures 19, 20, 21 and 22, Figures 19, 20 and 21 being enlarged sections taken on lines 19—19; 20—20 and 21—21 respectively of Figure 4.

The die block 149 is provided with movable sections 160 at the ends thereof constituting strippers. These stripper sections 160 have slots 161 formed therein which register with and correspond to the slots 162 in the main portion of the die block for receiving the lacing bars L'.

Each stripper block 160 is adapted to be raised and lowered with respect to the main body portion of the die block by means of pins 163 actuated by plungers 164 extending upwardly through the bed plate of the machine. These plungers 164 are carried by a cross head 165 pivotally connected as at 166 to a link 167 which in turn is pivotally connected to an arm 168 projecting from a sleeve 169 rotatably mounted on brackets 170 on the bottom side of the bed plate of the machine. An arm 171 projecting from the other end of sleeve 169 carries a roller 172 engaging a stripper cam 173 carried on shaft 75, see more particularly Figure 3.

Each of the stripper blocks 160 is normally pulled downwardly into engagement with the main die block 149 by means of springs 174 arranged in recesses in the main die block 149 and engaging the heads of pins or bolts 175 carried by the stripper blocks 160. With the above described construction the cam 173 at intervals, timed with respect to the swaging operations, will raise plungers 164 which, by means of the pins 163, will move the stripper blocks 160 upwardly to raise the lacing bars L' out of the guide slots or grooves 162. Thus the structure is permitted to move forwardly through the machine without being impeded, it being understood that the operation and formation of the ladder structure illustrated in Figure 31, is continuous.

By reference to Figures 35, 36 and 37 the next operation will be best understood, as in these figures the operation is most graphically illustrated. It is understood that while the hook wires H' are all of the same length, that these hook wires are so assembled with the lacing bars that they alternately project a greater distance from one side of the pair of lacing bars than the other. This is for the purpose of providing a completed structure in which the oppositely disposed hook ends will not be diametrically opposed to one another when clamped into the belt. In bending the ends of the hook wires to form the hooks, each hook portion is formed of the same size despite the alternately long and short hook wire ends presented to the bending mechanism. The manner in which this operation is performed can be best understood by reference to Figures 6, 14, 15, 16, 26 and 27, the latter two figures showing semi-diagrammatically the operation of the bending die.

As seen best in Figures 26 and 27 the lower die member or die block 176 is substantially T-shaped in vertical cross section and has a wide portion 177 and a relatively reduced portion 178, the shoulders 179 formed by the difference in size between the portions 177 and 178 being transversely staggered. The point ends of the hook wires are first bent downwardly at substantial right angles to the main portion of the hook wire and are subsequently bent inwardly against the inclined walls 180 of the die block 176. The first bending operation is accomplished by the bending dies 181 removably secured to the block 182, these bending dies having laterally and longitudinally spaced projections 183 which cooperate respectively with the portions 177 and 178 of the die block 176. Thus, these vertical die members act to bend downwardly the ends of the hook wires as they project beyond the edges of the die block 176. In a like manner the horizontal operating dies 184 are each provided with a pair of projecting portions 185 extending differential distances which cooperate respectively with the portions 177 and 178 of the die block to bend the hook ends inwardly against the inclined inside portion 180 at an acute angle to the main portion of the hook wire. Thus as the ladder structure leaves the bending dies the ladder has assumed the cross sectional contour illustrated in Figure 36.

During the bending operations just described the ladder structure is held firmly against the lower die block by means of a pressure member 186 normally urged downwardly into operative position by means of springs 187 arranged in recesses in the block 182 and surrounding headed bolts 188 which limit the downward movement of the pressure block. This structure can be best seen by comparison of Figures 11 and 14.

It is next in order to bend the ladder structure to bend the hook in substantially inverted U-shape such as shown in Figure 37. This is done by subjecting the structure to the action of a bending die 189 which has a bending surface 190 which progressively increases from a substantial flat surface to a semi-circular groove. This upper bending die cooperates with a lower die member 191 over which the ladder structure rides so that as the structure leaves the lower die member 191, it has been bent into the shape illustrated in Figure 37. This structure is illustrated best in Figures 13, 20, 29 and 30. In Figure 28 an inverted plan view of the upper die member 189 is shown and Figures 29 and 30 are left hand and right hand end views respectively of this die member.

Arranged above the upper die member 189 and between the ends of the cross head is a wedge 192 which upon longitudinal adjustment, vertically adjusts the upper die member 189.

In the organization of parts herein illustrated and described provision has been made for the advancement of the ladder structure through the machine a distance equal to two hooks in each increment. As the ladder structure leaves the last forming die the next operation is the severing of the completed belt hooks into lengths, each comprising a predetermined number of belt hooks. In the present instance means is provided whereby the belt hook ladder construction is severed into lengths or gangs of hooks containing eighty-four hooks. The structure by means of which the severing of the structure into lengths is accomplished, may best be understood by examination of Figures 12, 12A and 12B.

As seen from these views the cross head 56 carries a bracket 193 upon which a composite gear is rotatably mounted on a shaft 194. This composite gear comprises a ratchet wheel 195 having forty-two teeth and a one-tooth pinion 196. Pivotally mounted on bracket 193 as at 197 is a lever 198, the free end of which carries a pin or abutment 199. This pin 199 is adapted to engage a pair of fixed but adjustable stops 200 and 201 carried by means of a bracket 202 fixed to the bed plate of the machine. Carried by the bracket 193 is a spring pressed dog 203 which engages the teeth of the ratchet 195 to prevent clockwise movement thereof as seen in Figure 12, this dog permitting counter-clockwise movement of the ratchet.

The cross head 56, as previously explained, partakes of vertical reciprocation and the structure supported thereby, together with the arm 198, with it. During the upward movement of the cross head the pin 199 carried on the end of arm 198 engages the upper stop 201 and oscillates the arm 198 about its pivot 197 a distance equal to one tooth space of the ratchet 195 and during this movement of the arm 198 a dog 204 carried thereby causes a counter-clockwise movement of the ratchet 195 and consequently the one-toothed pinion 196, a corresponding distance. At the end of the downward movement of the cross head the pin 199 engages the lower stop 200 so that the arm 198 is moved to cause the dog 204 thereof to engage the next ratchet tooth. Thus it will be seen that after forty-two reciprocations of the cross head the composite gear will have made one complete rotation so as to bring the tooth 205 to its lowermost position as illustrated in Figure 12.

In this position the tooth 205 engages a corresponding projection 206 on a vertically reciprocable frame member 207 the latter being mounted for vertical sliding movement on a pair of vertical guides 208. Springs (not shown) normally urge the slidable frame member 207 into its uppermost position where it abuts stops 209 carried upon the upper ends of the guides 208. During the downward movement of the frame member 207 inclined surfaces 210 thereof engage similarly shaped surfaces on laterally movable anvils 211, these anvils being movable laterally to position the ends 212 thereof under the lacing bars L, the end portion 212 of these anvils being of a width to permit their entrance between a pair of adjacent belt hooks. The reference character 213 indicates a cutter having two cutting surfaces, one for each of the lacing bars L and cooperating respectively with the anvils 211.

Thus on the downward movement of the cross head after the tooth 205 has assumed the position illustrated in Figure 12, this movement of the cross head will be transmitted to the movable frame member 207 to depress the same. This movement of the frame member first moves the anvils 211 into operative position whereupon the cutter 213 will shear the two lacing bars and thus separate the gang or length of belt hooks, of predetermined length, from the ladder construction. Springs 214 are employed for returning the anvils to inoperative position upon upward movement of the cross head.

In Figures 38 and 39 a slightly modified form of construction is illustrated in which the hook wires X are united with lacing bars Y by means other than by swaging as herein previously described. As one means for accomplishing this uniting of the parts, reference is made to Figure 39 wherein a conventional form of electrical welding apparatus is illustrated. In this figure the welder is shown as comprising upper electrodes 215 adapted to engage lacing wire Y and lower electrodes 216 for the hook wires X. With such a construction the structure may be fed to the welder with a step-by-step movement as in the previously described construction and the welder operated to complete the welding operation to thus unite the lacing bar with the hook wires. The present invention contemplates effecting a permanent union between the lacing bars and hook wires by swaging or any expedient type of welding.

It is believed that from the foregoing the operation of the specific units of the organization will be understood and that the several steps or the method involved will be apparent to those skilled in this art. It should be noted however that in general one or more lengths of lacing bars L' (herein shown are two) are continuously fed longitudinally of the machine by a step-by-step movement, the distance in the present instance being equal to two belt hooks. Two lengths of belt hook wire H' are simultaneously fed by feeding means operating transversely of the machine from opposite sides of the lacing bars L'.

The two lengths of belt hook wire H' are fed over the lacing bars L' and transversely thereto whereupon the belt hook wire is severed into lengths suitable for forming the belt hooks. The lacing bars L' are perforated to provide in each, corresponding open end recesses and the severed lengths of belt hook wire are forced into these recesses and secured therein by a swaging operation which substantially closes the open end of the recesses. The lengths of belt hook wires alternately project further on opposite sides of the lacing bars L' and subsequently the long and short ends of these wires are bent to provide hook-like ends. As this ladder-like structure progresses through the machine in a step-by-step movement it is subjected to further bending operations wherein the structure is bent transversely into substantial U-shape to thus produce belt hooks of standard commercial form. Arranged adjacent the discharge end of the machine is means for automatically severing the lacing bars at predetermined intervals so as to separate the structure into strips of predetermined length.

The operations are all correlated and timed so that the strips of belt hooks are successively formed by continuous operations.

It is obvious that the lacing bars and belt hooks may be united by means other than the swaging operation included in the instant embodiment of this invention and to this end reference is made to the welding means illustrated semi-diagrammatically in Figures 38 and 39 as it would be possible to substitute this or other uniting means for the swaging means, as will be obvious.

Reservation is made to make such changes, modifications or re-arrangements in all of the non-essential details of construction as may come within the purview of the accompanying claims.

What we claim as our invention is:

1. In the method of manufacturing a strip of belt lacing hooks, those steps which consist in perforating a lacing bar to provide open end recesses engaging belt hook forming members in said recesses to unite said bar and members and bending said members longitudinally thereof to form belt hooks.

2. In the method of manufacturing a gang or strip of belt lacing hooks, those steps which consist in perforating a lacing bar at one edge thereof to provide open end recesses, transversely superposing belt hook wires with respect to said lacing bar and engaging said wires in said recesses, uniting the parts by a swaging operation, and bending the resulting structure to produce substantially U-shaped hooks.

3. In the method of manufacturing a gang of belt lacing hooks, those steps which consist in perforating a pair of spaced parallel lacing bars to provide open end recesses therein, superposing thereon transversely extending hook wires in spaced parallel relation, engaging each hook wire in a corresponding pair of recesses in said lacing bars, uniting said lacing bars and hook wires by a swaging operation, and bending the hook wires to produce a structure substantially U-shaped in transverse cross section.

4. A continuous method of forming strips of belt lacing hooks which consists in successively perforating a lacing bar to form longitudinally spaced open end recesses, transversely superposing belt hook wires with said lacing bar, engaging said belt hook wires in said recesses, uniting the parts by swaging, bending the hook wires longitudinally to provide substantially U-shaped hooks and severing the lacing bar to provide strips of proper length.

5. A continuous method of forming strips of belt lacing hooks which consist in feeding continuous lengths of lacing bars in spaced parallel relation, successively perforating said lacing bars to provide open end recesses therein, feeding continuous lengths of belt hook wires transversely of said lacing bars in superposed relation thereto, severing said belt hook wire into belt hook lengths and engaging the same in said recesses, successively uniting said lacing bars and belt hook wires by swaging operations, successively bending the ends of said wires to form hooks, successively bending the resulting structure to a substantial U-shape and automatically severing the lacing bars at predetermined intervals.

6. In a machine of the class described, means for feeding lacing bars and hook wires transversely of one another, means for uniting the hook wires and lacing bars to form a ladder structure, and means for bending the hook wires while in assembled relation with said bars to form belt hooks of substantial U-shape.

7. In a machine of the class described, means for transversely superposing belt hook wires and lacing bars, means for permanently uniting said belt hook wires, and lacing bars, means for shaping said wires while the latter are in assembled relation with said bars to form belt hooks of substantial U-shape and means for severing said lacing bars to provide strips of belt lacing hooks.

8. In a machine of the class described, means for longitudinally feeding a pair of spaced parallel lacing bars, means for introducing belt hook wires transversely thereof and in spaced parallel relation, means for uniting said belt hook wires and lacing bars, means for shaping said belt hook wires while the latter are in assembled relation with said bars to form belt hooks and means for severing said lacing bars at predetermined intervals to provide strips of belt lacing hooks.

9. In a machine of the class described, means for longitudinally feeding a pair of spaced parallel lacing bars, means for successively perforating said bars to provide longitudinally spaced open end recesses, means for introducing belt hook wires transversely of said lacing bars, means for engaging said belt hook wires in said recesses, means for shaping said belt hook wires to form belt hooks and means for severing said lacing bars at intervals to provide strips of belt lacing hooks.

10. In a machine of the class described, means for longitudinally feeding a pair of spaced parallel lacing bars, means for successively perforating said bars to provide longitudinally spaced open end recesses, means for introducing belt hook wires transversely of said lacing bars, means for engaging said belt hook wires in said recesses, means for uniting said belt hook wires and lacing bars by swaging operation, means for shaping said belt hook wires to provide belt hooks and means for severing said lacing bars at intervals to provide strips of belt lacing hooks.

11. In a machine of the class described, means for longitudinally feeding a pair of spaced parallel lacing bars, means for simultaneously feeding a pair of belt hook wires from opposite sides of said lacing bars and transversely superposing the same thereon, means for permanently uniting said belt hook wires and lacing bars, means for shaping said belt hook wires to form belt hooks and means for severing said lacing bars at predetermined intervals.

12. In a machine of the class described, means for longitudinally feeding continuous lengths of spaced parallel lacing bars, feeding means operating transversely thereto for simultaneously feeding a pair of belt hook wires, means for uniting said belt hook wires and lacing bars, means for shaping said belt hook wires to provide belt hooks of substantial U-shape and means for severing said lacing bars to provide gangs of belt hooks of predetermined length.

13. In a machine of the class described, means for longitudinally feeding continuous lengths of spaced parallel lacing bars, feeding means operating transversely thereto for successively feeding pairs of belt hook wires respectively from opposite sides of said lacing bars, means for assembling said belt hook wires with said lacing bars, means for successively shaping said belt hook wires to provide belt hooks and means for severing said lacing bars.

14. In a machine for continuously forming strips of belt lacing hooks, means for longitudinally feeding continuous lengths of lacing bars with a step-by-step movement, means for successively perforating said lacing bars to form corresponding recesses therein, means on opposite sides of said lacing bars for simultaneously feeding continuous lengths of belt hook wire transversely of said lacing bars, means for severing said belt hook wire into belt hook lengths, means for positioning said lengths of said belt hook wire into said recesses, means for uniting said lengths of belt hook wire and said lacing bars, means for shaping said belt hook wires to form belt hooks and means for severing said lacing bars at predetermined intervals to form strips of belt lacing hooks.

15. In a machine for continuously forming strips of belt lacing hooks, means for longitudinally feeding continuous lengths of lacing bars with a step-by-step movement, means for successively perforating said lacing bars to form corresponding recesses therein, means on opposite sides of said lacing bars for simultaneously feeding continuous lengths of belt hook wire transversely of said lacing bars, means for severing said belt hook wire into belt hook lengths, means for positioning said lengths of said belt hook wire into said recesses, swaging means for uniting said belt hook wires and lacing bar, means for shaping said belt hook wires to form belt hooks and means for severing said lacing bars at predetermined intervals to form strips of belt lacing hooks.

16. In a machine for continuously forming strips of belt lacing hooks, means for longitudinally feeding continuous lengths of lacing bars with a step-by-step movement, means for successively perforating said lacing bars to form corresponding recesses therein, means on opposite sides of said lacing bars for simultaneously feeding continuous lengths of belt hook wire transversely of said lacing bars, means for severing said belt hook wire into belt hook lengths, means for positioning said lengths of said belt hook wire into said recesses, means for bending the end of said belt hook wires to form hooks, means for successively bending the resulting structure to a substantial U-shape in cross section and automatic means for severing said lacing bars at predetermined intervals to form strips of belt lacing hooks.

17. In the method of manufacturing a strip of belt lacing hooks, those steps which consist in transversely superposing a plurality of belt hook forming wires with respect to a lacing bar, permanently uniting said hook wires with said lacing bar, and subsequently fastening said wires to form belt hooks of predetermined shape.

18. In the method of manufacturing a strip of belt lacing hooks, those steps which consist in transversely superposing a plurality of belt hook forming wires with respect to a lacing bar, permanently uniting said hook wires with said lacing bar, and shaping said wires while the latter are in assembled relation with said bar to form belt hooks.

19. In the method of manufacturing a strip of belt lacing hooks, those steps which consist in perforating a lacing bar to provide open end recesses, engaging belt hook forming members in said recesses, uniting said bar and members to form a unit and subsequently fashioning said members to form belt hooks of predetermined shape.

20. In the method of manufacturing a strip of belt lacing hooks, those steps which consist in arranging a pair of bars in parallel spaced relationship, superimposing thereon transversely extending hook forming wires, permanently uniting said hook forming wires with the lacing bars, and bending the assembly about a line intermediate the bars and extending parallel thereto to form belt hooks of predetermined shape.

21. In the method of manufacturing a strip of belt lacing hooks, those steps which consist in perforating a pair of spaced parallel lacing bars to provide open end recesses therein, superimposing thereon transversely extending hook forming wires in spaced parallel relation, engaging each hook forming wire in a corresponding pair of recesses in said lacing bars, permanently uniting said hook forming wires to the bars, and bending the assembly on a line intermediate the bars and substantially parallel thereto to form belt hooks of predetermined shape.

In testimony whereof we affix our signatures.

ORVILLE B. BRIGGS.
GRANT M. RICHARD.